United States Patent
Barbier et al.

(10) Patent No.: US 9,285,212 B2
(45) Date of Patent: Mar. 15, 2016

(54) OPTICAL SYSTEM FOR POSTURE DETECTION COMPRISING A SCANNING LIGHT SOURCE AND A CUBE CORNER

(71) Applicant: THALES, Neuilly sur Seine (FR)

(72) Inventors: Bruno Barbier, Bordeaux (FR); Laurent Potin, Coutras (FR); Siegfried Rouzes, Le Haillan (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 14/512,327

(22) Filed: Oct. 10, 2014

(65) Prior Publication Data
US 2015/0103359 A1    Apr. 16, 2015

(30) Foreign Application Priority Data
Oct. 11, 2013    (FR) .................................... 13 02362

(51) Int. Cl.
| | |
|---|---|
| *G01B 11/14* | (2006.01) |
| *A42B 3/00* | (2006.01) |
| *G01S 17/46* | (2006.01) |
| *G01S 17/74* | (2006.01) |

(52) U.S. Cl.
CPC . *G01B 11/14* (2013.01); *A42B 3/00* (2013.01); *G01S 17/46* (2013.01); *G01S 17/74* (2013.01)

(58) Field of Classification Search
CPC ................................................... G01B 11/14
USPC ........................................................ 356/614
See application file for complete search history.

(56) References Cited

U.S. PATENT DOCUMENTS

2014/0016138 A1*    1/2014    Barbier .................. G01B 11/14
356/614

FOREIGN PATENT DOCUMENTS

| | | |
|---|---|---|
| EP | 0 477 888 A2 | 4/1992 |
| EP | 0 493 651 A2 | 7/1992 |
| EP | 2 071 283 A2 | 6/2009 |
| EP | 2 278 381 A1 | 1/2011 |
| EP | 2 554 942 A1 | 2/2013 |
| FR | 2 433 760 A1 | 3/1980 |
| GB | 2 301 968 A | 12/1996 |

OTHER PUBLICATIONS

French Search Report for French Counterpart Application No. FR 1302362, 9 pgs. (Apr. 10, 2014).

* cited by examiner

*Primary Examiner* — Roy M Punnoose
(74) *Attorney, Agent, or Firm* — Blakely, Sokoloff, Taylor & Zafman LLP

(57) ABSTRACT

The general field of the invention is that of systems for detecting the posture of a mobile object in space. The system according to the invention comprises an electro-optical device comprising a light source, a photoreceptor and means of analysis, and a retro-reflecting cube corner disposed on the mobile object. The cube corner comprises a mask disposed on its entry face. The source emits a parallel or almost-parallel pencil beam. The electro-optical device comprises means for deviating, about a fixed point, the said pencil beam of light by an angle varying as a function of time. The photoreceptor is configured for receiving the pencil beam of light retro-reflected by the cube corner. The means of analysis are configured in such a manner as to determine, based on the signal coming from the photoreceptor, the position of a number of points representative of the borders of the mask and, using this positional information, the posture of the cube corner in space.

9 Claims, 8 Drawing Sheets

OPTICAL SYSTEM FOR POSTURE DETECTION COMPRISING A SCANNING LIGHT SOURCE AND A CUBE CORNER

BACKGROUND OF THE INVENTION

1. Technical Field of the Invention

The field of the invention is that of optical devices allowing the orientation of an object in space to be measured without contact. There exist various possible fields of applications, but the main application is posture detection for a helmet of an aircraft pilot, thus allowing an image to be projected into his/her visor in exact superposition over the external scene or various systems of the aircraft to be closed-loop controlled onto his/her gaze. The precision sought in such systems is of the order of a milliradian. In the description that follows, the posture of an object is understood to mean its position and its orientation in space.

2. Description of the Prior Art

Various optical techniques exist that allow measurements of orientation to be made on a helmet. Generally speaking, easily-identifiable elements are installed on the helmet which are picked out by a system of cameras. The position of the images of these identifiable elements allows the orientation of the helmet to be determined by calculation.

These elements may be passive or active. The passive elements are illuminated by an external source. For this purpose, retro-reflecting cube corners or retro-reflectors may be used. The optical emitting and receiving devices just need to be placed on the same axis.

These retro-reflector systems are relatively insensitive to sunlight. They may be combined with a point source associated with a sensor array without an optical lens.

In this configuration, the reflector is equipped with a mask that is transmissive in the central part and opaque around the periphery. This mask is applied onto the entry face of the reflector. By way of example, the contour of the mask has the shape of a parallelogram, thus representing the orientation of two fixed directions of the helmet. The orientation of the helmet is calculated by analysis of the shape of the contour projected onto the sensor. The analysis relates to the transitions between the illuminated and dark regions of the reflection received by the sensor. This optical device is simple to implement and has a large depth of field.

FIGS. 1 and 2 illustrate this type of detection system. In FIG. 1, the point source S illuminates a cube corner CC comprising a mask MK. The light beams reflected by the said cube corner are received by two photosensitive sensor arrays disposed in two different planes P1 and P2, close to the source S so as to limit the size of the image. Thus, the points M1 and M2 of the mask have as respective projections, in the planes P1 and P2, the pairs of points K2 and M"1 and M"2. The orientation sought for the sides bounded by the points M1 of the mask MK is obtained by combining the measured orientations of the sides of the contours bounded by the points M'i and M"i of the light reflections on the planes P1 and P2.

FIG. 2 shows one variant of the system described in FIG. 1. In this variant, a shuttering screen EC is placed in the neighbourhood of the source. The projected image of the mask is obtained on a single sensor array disposed in the plane P1, as previously, and also the dark contour of the shuttering screen EC. This contour is bounded in the plane of FIG. 2 by the points e'1 and e'2. The position of the point S0, which is symmetrical with the point S with respect to the apex O of the cube corner, is obtained from the measured positions of the apices of the shadow projected by the shuttering screen. The sought orientation of the sides of the mask MK is then obtained by combining the measured orientations of the sides of the contour of the light reflection on the plane P1 with the measured position of S0.

However this technical solution has certain drawbacks. In the first place, the illuminating point source continuously emits into an angular opening that is sufficiently wide to cover all the possible positions of the reflector. A very large part of the light intensity is therefore always lost, since it does not reach the reflector. This part of the light is, moreover, radiated into the surrounding space, inside and outside of the cabin, thus being detrimental to the stealth of the aircraft.

Furthermore, in the central projection used for determining the orientation of the reflector, the plane of projection is known, but not the position of the centre of projection. In order to eliminate this unknown, two measurements are combined together that are carried out over the contours of two different projected figures obtained with the same centre of projection. The overall uncertainty in the orientation measurement cumulates the error of each of these two measurements.

Lastly, the posture is calculated after the complete image has been acquired and supplied by the image sensor or sensors. The duration of the measurement cycle is limited by the time for addressing an image sensor array, i.e. around 16 ms, which can lead to a measurement error in the case of a high-speed rotation of the mobile object.

SUMMARY OF THE INVENTION

The system for detecting the posture of a mobile object according to the invention does not have these drawbacks. It comprises a scanning light source. Thus, in the measurement phases, the scanning can be centred over the useful region of the retro-reflector. Any loss of energy and any loss of measurement time is thus avoided. More precisely, the subject of the invention is a system for detecting the posture of a mobile object in space, the said system comprising:

an electro-optical device of known orientation comprising a point light source, a photoreceptor and means for analyzing signals coming from the said photoreceptor;

an optical assembly comprising at least one cube corner disposed on the mobile object, the said cube corner comprising a mask of known geometrical shape disposed on its entry face;

characterized in that:

the source emits a parallel or almost-parallel pencil beam of light;

the electro-optical device comprises means for generating a pencil light beam which is angularly controlled and rotating about a fixed point;

the photoreceptor being configured for receiving the pencil beam of light retro-reflected by the cube corner when it is illuminated by the deviated pencil beam of light coming from the light source;

the means of analysis being configured in such a manner as to determine, based on the signal coming from the photoreceptor, the position of a number of points being representative of the borders of the mask of the cube corner and, using this positional information, the posture of the cube corner in space.

Advantageously, the photoreceptor is disposed at the focal point of a focussing lens disposed in the neighbourhood of the light source, Advantageously, the electro-optical device comprises a semi-reflecting plate allowing the emitted pencil beam of light to be separated from the pencil beam of light retro-reflected by the cube corner.

Advantageously, the electro-optical device comprises an opaque screen of known geometrical shape disposed in the neighbourhood of the emission source.

Advantageously, the emission source is a laser source.

Advantageously, the means for generating an angularly-controlled pencil light beam comprise a two-axis laser beam deviator.

Advantageously, the system comprises two modes of operation, the first mode being a search mode in which the generation means deviates the pencil beam of light into a wide angular space in such a manner as to scan the maximum displacement volume of the cube corner;

the second mode being a measurement mode in which the generation means deviates the pencil beam of light into a restricted angular space, sufficient to cover the entry surface area of the cube.

Advantageously, in the second mode, the generation means deviate the pencil beam of light in such a manner as to obtain, by projection onto a reference plane, a certain number of radiating lines centred on a central point I, this point I being the projection of a fixed orientation of a pencil beam of light directed onto the entry face of the cube corner, the points being representative of the borders of the mask of the cube corner being obtained by the determination of the angular position of the end of each radial line.

BRIEF DESCRIPTION OF THE DRAWINGS

The invention will be better understood and other advantages will become apparent upon reading the description that follows presented by way of non-limiting example and thanks to the appended figures, amongst which.

DETAILED DESCRIPTION

Figure 1:
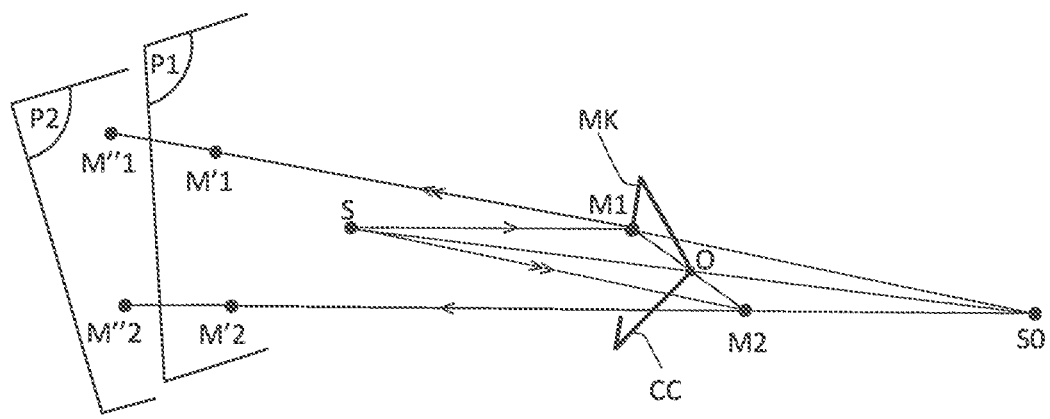
FIG. 1, previously discussed, shows an overall schematic diagram of a first optical system according to the prior art.
Figure 2:
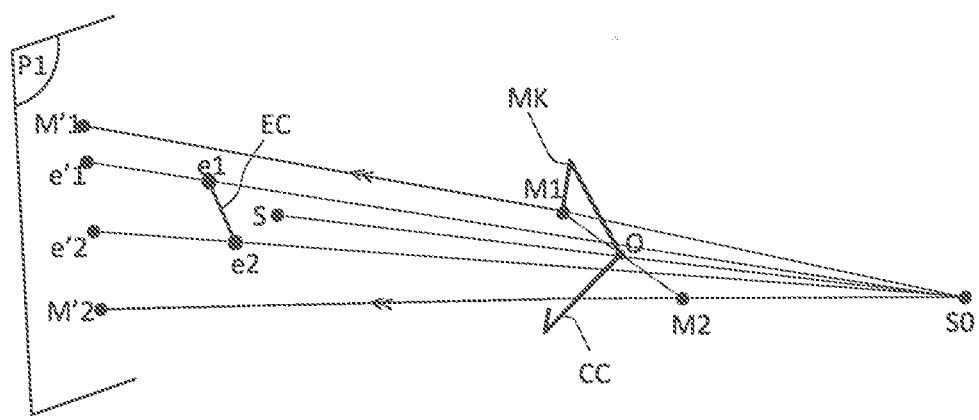
FIG. 2, previously discussed, shows an overall schematic diagram of a second optical system according to the prior art.
Figure 3:
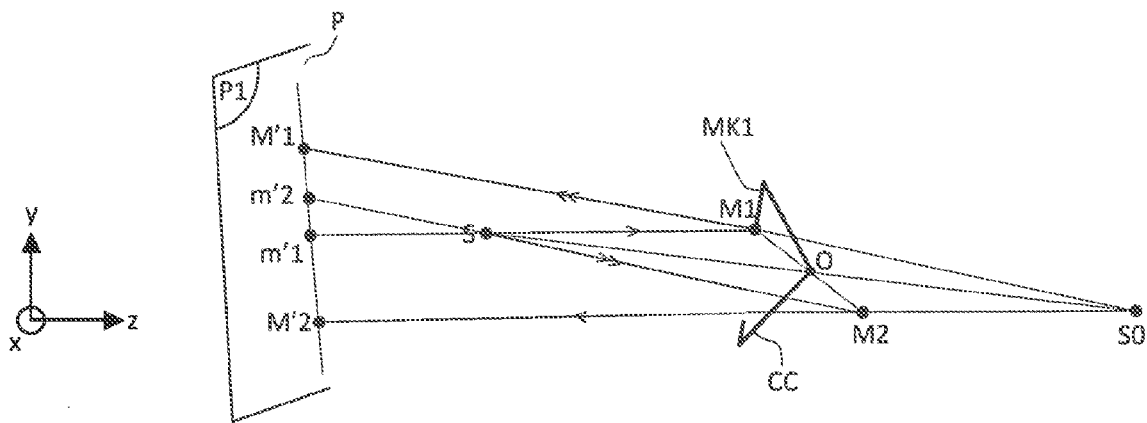
FIG. 3 shows the principle of operation of a posture detection system according to the invention.

FIG. 3 shows the principle of operation of a posture detection system according to the invention. The detection system essentially comprises a fixed assembly of known position and a mobile assembly. The fixed assembly comprises an electro-optical device of known orientation comprising a light source S, a single photoreceptor P disposed in a plane P1 and a means for analyzing signals coming from the said photoreceptor which is not shown in FIG. 3. P1 is parallel to a plane (x, y). The mobile assembly comprises a cube corner CC disposed on a mobile object whose posture it is sought to determine, the said cube corner comprising a mask of known geometrical shape disposed on its entry face. The mobile object is not shown in the various figures. In the case of aeronautical applications, this will be the helmet of the pilot.

The light source S is a point-like source. It emits a thin pencil beam of light. Scanning means provide the angular displacement of this pencil beam about S which thus sweeps the space in which the cube corner CC, comprising a mask MK1, is located. The mask MK1 is, for example, a parallelogram of which M1 is one of the apices. The virtual mask MK2, which is symmetrical with MK1 with respect to O, has an apex M2, which is symmetrical with M1. The point S0 is the point symmetrical to the source S with respect to the apex O of the cube corner. The real retro-reflection on the plane P1, resulting from the projection with centre S0, has a contour with a quadrilateral shape shown with dashed lines in FIG. 4 of which M'1 and M'2 are apices. The sides of the projected quadrilateral intersecting at M'1 are the projections, by the projection with centre S0, of the sides of MK1 intersecting at M1, and the sides of the projected quadrilateral intersecting at M'2 are the projections, by the projection with centre S0, of the sides of MK2 intersecting at M2.

To any known orientation, at time t, of the illuminating pencil beam there corresponds a point m' with known coordinates x and y, virtually projected onto the plane P1 by the projection with centre S. With this point m' is associated a video signal v(x, y, t), supplied by the detector P, detecting the real reflected pencil beam. During the scanning of the illuminating pencil beam, the digitized position (x, y) on P1 and the corresponding digitized video v(x, y, t) are successively written into an image memory M.I. representing a "virtual illumination" of P1.

After the scanning by the pencil beam of all the angular space, the set of "lit" points m', in other words, those with a non-zero video in the image memory M.I., are located inside of a surface. This virtual surface on P1, resulting from the projection with the centre S, has the shape of a quadrilateral shown with the solid lines in FIG. 4 of which m'1 and m'2 are apices.

The sides of the projected quadrilateral intersecting at m'2 are the projections, by the projection with centre S, of the sides of MK2 intersecting at M2, and the sides of the projected quadrilateral intersecting at m'1 are the projections, by the projection with centre S, of the sides of MK1 intersecting at M1. The points of intersection e0 and f0 of the sides, taken in pairs, of the virtual quadrilateral are the two vanishing points of the two directions of the contour of the mask MK1. The straight lines S-e0 and S-f0 are parallel to the two sought directions of the mask MK1.

The orientations of the sides of the mask are known, hence the orientation of the segment M1M2 is also known. As a consequence, in the triangle M1-S-M2 in FIG. 3, all the angles are known. Since the length 2h of the segment M1M2 is known by construction, the triangle M1-S-M2, which is contained in the plane m'1-S-m'2, is entirely determined and hence so is the position of the middle O of M1-M2.

Figure 4:
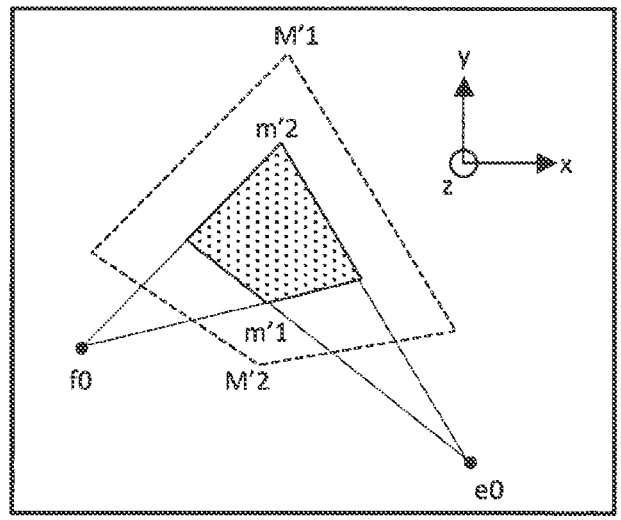
FIG. 4 shows, in a reference plane, the virtual figure formed by the scanning beam coming from the source and by the beam retro-reflected by the cube corner.

The measurement of the orientation of the reflector is based on the orientations of the projections of two consecutive sides of the contour of MK1 with respect to the projections of the two consecutive sides of MK2, symmetrical with the preceding ones shown in FIG. 4, the sides of the contour of MK1 only having two orientations. This measurement principle is applicable to other polygonal contour shapes such as, for example, a polygonal contour with three orientations, a triangle or a convex hexagon with pairs of parallel sides, whether the sides be coplanar or otherwise.

Figure 5:
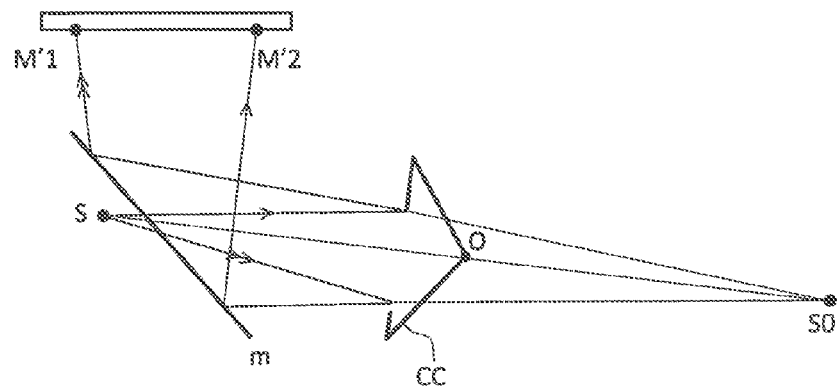
FIG. 5 shows a mode of optical separation between the scanning beam coming from the source and the retro-reflected beam.

By the very nature of the method, the emitted and reflected beams have neighbouring incidences. In order to separate the emitted beams from the retro-reflected beams, the electro-optical device can comprise a semi-reflecting plate m disposed in front of the point source S, as indicated in FIG. 5, with the drawback that the received intensity is four times lower than the emitted intensity.

Figure 6:
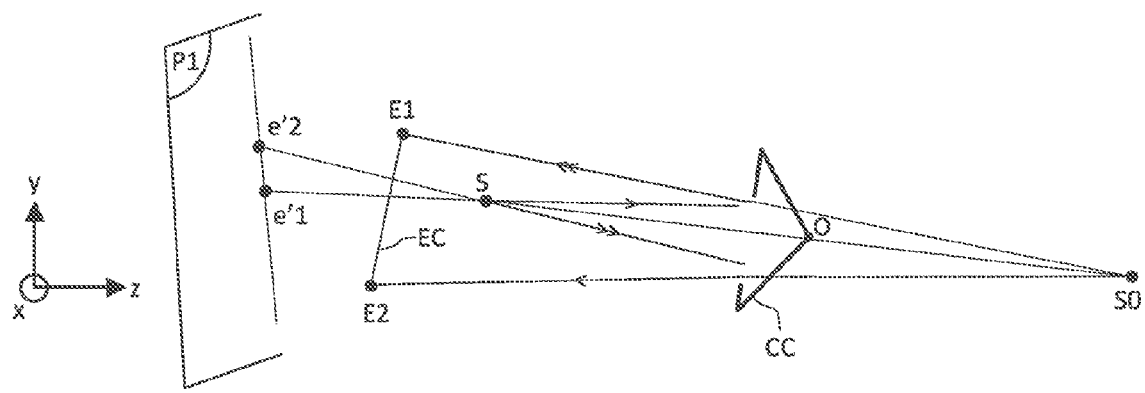
FIG. 6 shows one variant of the principle of operation of a posture detection system according to the invention, the system comprising an opaque central screen.
Figure 7:
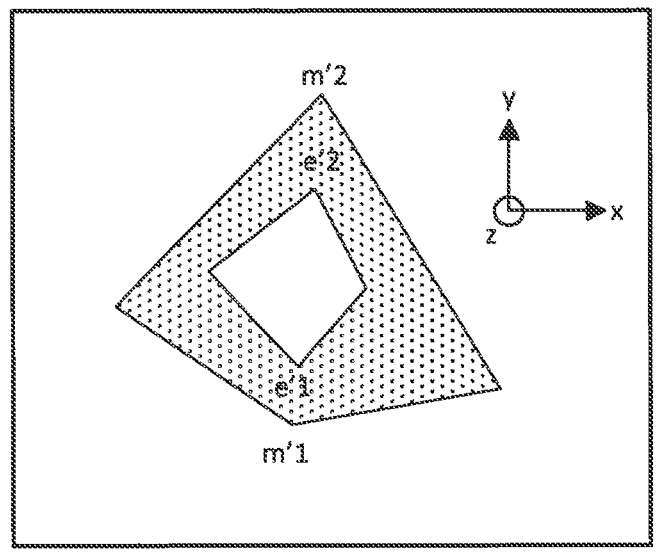
FIG. 7 shows, in a reference plane, the virtual figure formed by the scanning beam coming from the source and retro-reflected by the cube corner in the case of a central screen.

Also, in one variant embodiment illustrated in FIGS. 6 and 7, a convex polygonal shuttering screen EC is disposed fixed at the rear and close to S. This screen does not modify the shape of the contour of the real reflection projected on P1. It does not therefore modify the form of its representation in the memory either. This screen is for example constituted by the body of the deviator used for deviating the beams. As illustrated in FIG. 6, the contour of the screen EC passes through two apices E1 and E2 with known positions.

The whole set of points with zero video in the image memory is inside of a surface with a polygonal contour which passes through two apices e'1 and e'2 and which is situated inside of the preceding lit virtual quadrilateral with apices m'1 and m'2 as illustrated in FIG. 7.

These apices e'1 and e'2 correspond to the illuminating directions which generate the retro-reflected rays passing through the apices E1 and E2 of the screen EC, in other words the rays S0-E1 and S0-E2. The positions of the apices e'1 and e'2 in the memory give the direction of the rays S0-E1 and S0-E2. The intersection of these two rays gives the position of S0 and hence that of the point O being sought, in the middle of the segment S-S0. The presence of the screen EC thus allows the precision of the position measurement to be improved without reducing the useful received light intensity.

The posture detection system according to the invention operates according to two modes. The first mode of operation corresponds to a search phase. The approximate angular position of the reflector CC, as seen from the source S, is determined by a wide angular field scanning. The second mode of operation corresponds to a measurement phase. The precise orientation measurement is carried out by a specific scanning whose central direction is the angular position previously determined.

The scanning consists of a continuous series of orientations of the illuminating pencil beam, with which there corresponds a fine and continuous light tracing onto a projection plane. In the device according to the invention, the representation in the image memory M.I. of the virtual content of the projection plane P1 provided by the illuminating pencil beam is used. The method of analysis consists of reconstructing the shape of the contours of the virtual image, using a simplified and appropriate single "wire-frame" tracing, stored in the image memory. One part of the analysis is carried out in the course of tracing, and another part at the end of tracing.

During the search phase, at least one angular orientation of the illuminating pencil beam is identified to which there corresponds a point m' in the image memory M.I. situated inside of the lit video quadrilateral. The entirety of the amplitude of the angular field of the deviator is scanned in such a manner as to obtain, on the plane P1, the frame of a tracing of the "television" type, in other words an array of equidistant straight lines being parallel to the same "horizontal" axis, traced out along this axis, alternately in one direction, then in the other at a constant and high speed, and along the "vertical" axis perpendicular to the horizontal axis at a slow speed and in a step-by-step fashion. The method consists of detecting two consecutive video transitions, over at least one horizontal line of the tracing, in other words a transition which makes the video go from dark to lit, followed, on the same traced line, by the reverse transition from lit to dark, indicating that the system has detected a point of the contour.

Figure 8:
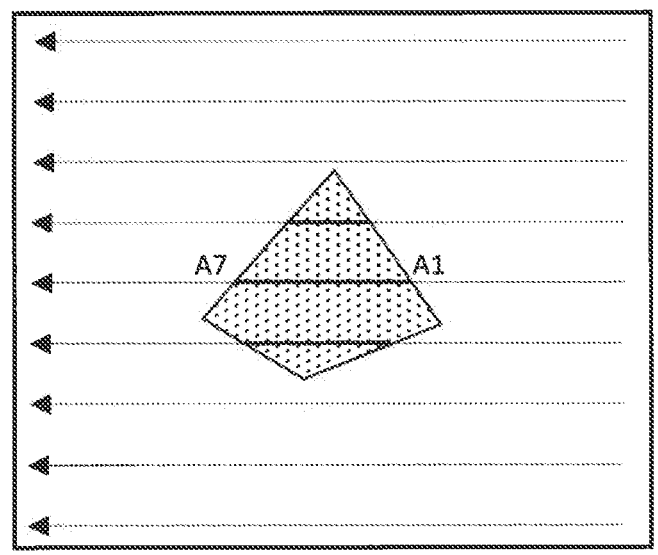
FIG. 8 shows the search mode of the scanning system according to the invention.

FIG. 8 shows:
  the "theorical" reflection which would be obtained in the image memory M.I. with a scanning frame whose vertical sampling pitch was infinitely thin, the greyed-out surface representing the lit video points;
  the real reflection obtained with a real scanning frame, whose vertical pitch is wide. A dashed line on the trace indicates a dark video and a continuous line on the trace indicates a lit video.

When several lit video segments are detected, as in FIG. 8, the longest segment is chosen, this being A7-A1. The point I, in the middle of the segment A7-A1, is thus situated inside of the lit video quadrilateral with an unknown contour.

The object of the measurement phase is to determine the directions of the projections of the sides of the mask of the cube corner in the plane of the photoreceptor which subsequently allows the posture of the cube corner to be determined. In order to perform this measurement, the following properties are exploited in order to determine the convex polygonal contour of a lit surface:
  the points of the sought contour are characterized by a single video transition during any given tracing;
  for a direction of tracing directed from the inside towards the outside of the contour, this transition makes the video go from the lit state to the dark state;
  since the contour is polygonal, three aligned video transition points determine a straight line carrying one of the sides of the contour;
  the contour being, for example, a quadrilateral, four separate straight lines are sufficient for determining the whole of the contour. The contour is therefore determined by at least twelve video transition points.

There exist various methods for determining these transition points. It is clear that the aim is to obtain the localization of the transition points with a minimum scanning time for the pencil beam.

Figure 10:
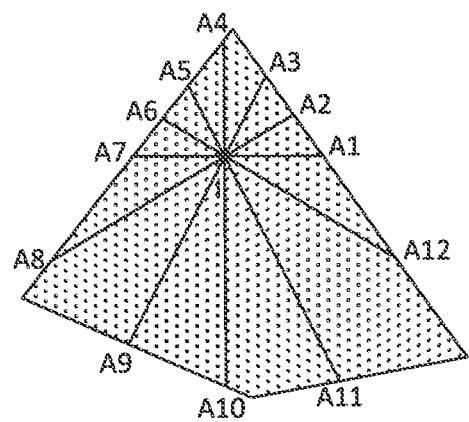
Figure 11:
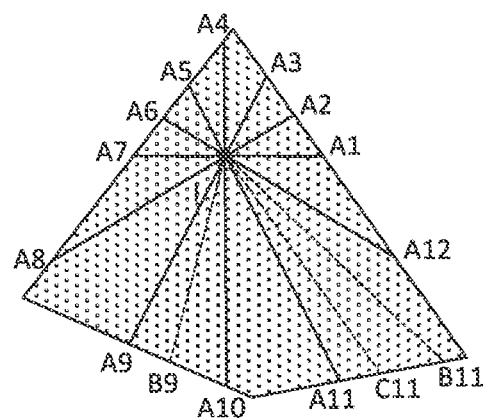
Figure 12:
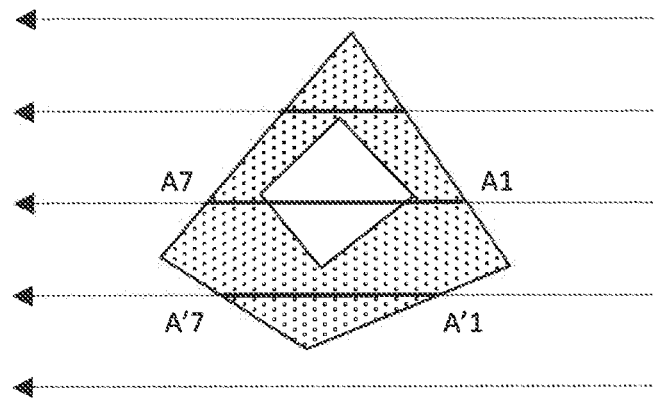
FIGS. 12 and 13 show the various steps of the measurement mode according to the invention in the case of a mask and a shuttering screen.
Figure 13:
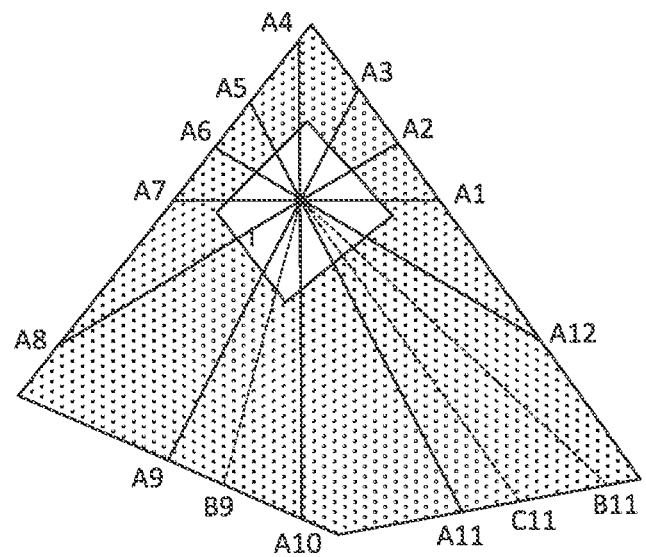

By way of example, a method for detecting points on the contour is shown in FIGS. 9 to 13. The method described in FIGS. 9 to 11 relates to a device without a shuttering screen. FIGS. 12 and 13 illustrate one variant of this method in the presence of a shuttering screen.

Figure 9:
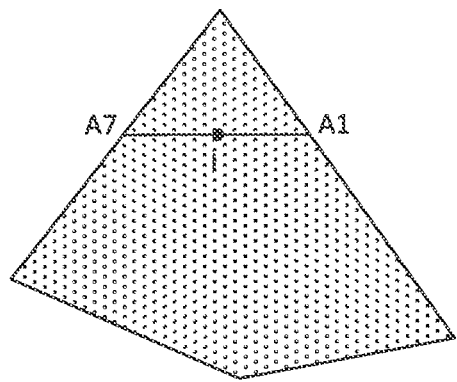
FIGS. 9, 10 and 11 show the various steps of the measurement mode according to the invention in the case of a mask alone.

The orientation measurement begins by a central positioning of the scan trace at a given point inside of the unknown quadrilateral. The middle I of the segment A7-A1 with the lit video, previously determined in the search phase, is chosen as indicated in FIG. 9. The contour sought therefore contains the transition points A1 and A7.

Starting from point I, an oblique straight line is traced at 30 degrees to the horizontal I-A1. The tracing is halted as soon as the transition into dark video is detected. As can be seen in FIG. 10, a third point of the contour, the point A2, is thus obtained. A return tracing from A2 to I, which is for example rectilinear, is then performed. In order to minimize the emitted energy, the pencil beam can be extinguished during this return trace, if such an extinction device exists. In order to decrease the total measurement time, the return time may be shortened, or even removed, if the device permits it. This process is repeated so as to obtain, in total, as can be seen in FIG. 10, a tracing of twelve radial lines whose ends are numbered from A1 to A12, originating from I and pivoted with respect to one another by an angle of 30 degrees in such a manner as to cover the entirety of the space over 360 degrees.

For the twelve video transition points thus obtained, the groups of at least three aligned points are sought. In the particular example in FIG. 10, the process of tracing radial lines is continued as follows. Two groups of at least three aligned points are obtained, namely the group A12-A1-A2-A3 and the group A4-A5-A6-A7-A8. Each of these groups defines one of the sides of the contour sought.

For the isolated points, in other words not aligned with at least two others points, complementary radial lines are then added. These isolated points are, in this example, A9, A10 and A11. The tracing of a first complementary radial line is added, pivoted by 15 degrees with respect to the radial line carrying the first isolated point, this being A9. As indicated in FIG. 11, the new video transition point, namely B9, is obtained. The three points A9-B9-A10 are aligned.

For the isolated point A11, a radial tracing pivoted by 15 degrees and another pivoted by 7.5 degrees are added. These tracings provide the two complementary video transition points B11 and C11. The three points of this latter group A11-C11-B11 are aligned.

For this example, fifteen transition points are finally obtained, divided into four groups each consisting of at least three aligned points. The process of tracing radial lines is stopped. These four groups define four straight lines intersecting in pairs. The contour of the quadrilateral sought is given by the four segments of straight lines determined by the four intersecting pairs of these four straight lines.

As indicated above, the orientations of the sides of this quadrilateral give the orientation of the mask from which the position of the apex O of the reflector CC is deduced.

By comparison with the prior art, which requires the recording of a complete image on a sensor array, the present measurement phase only practically lasts for the duration of the successive tracing operations of the twelve radial lines, and can therefore be extremely short.

The position of the "centre" J of the reconstructed quadrilateral is then calculated. This is, for example, with respect to the quadrilateral, the "optimal inscribed" circle or the "optimal circumscribed" circle or, alternatively, the point of intersection of the diagonals. This point J of course moves over time. However, this point remains a point internal to the lit quadrilateral corresponding to the following measurement if the time difference between two measurements remains sufficiently small. If such is the case, the following orientation measurement uses this point as the centre I for its tracing of radial lines. It then leads to the determination of the following quadrilateral and of its centre. If such is not the case, the search phase is re-initialized. Going into or remaining in closed-loop control mode therefore consists of verifying, prior to each new tracing of radial lines, that the point I chosen as the centre of the radial lines to be traced, namely the centre J of the preceding measurement, is really still a lit video point.

If the fixed device comprises a shuttering screen, the preceding method is slightly modified. The following complementary property is then exploited for determining the contour of the dark surface. The latter is always inside of the lit quadrilateral.

The objective consists of identifying at least one angular orientation of the illuminating pencil beam, to which there corresponds a point m' in the image memory M.I., situated not only inside of the lit video quadrilateral, but also inside of the virtual shadow internal to the preceding lit quadrilateral. In this way, all the radial lines, not only some of them, having this point as origin undergo, with respect to the previous simplified process, an additional video transition, namely a dark/lit transition.

The method consists in detecting, as indicated in FIG. 12, four video transitions, on at least one horizontal line of the trace, in other words the existence inside of the initial sequence, namely a dark/lit transition followed by a lit/dark transition of the inverse sequence, of a transition dark/lit followed by a lit/dark transition. In the case where only a tracing with two transitions is detected, which corresponds to the points A'1 and A'7, in order to obtain a tracing with four transitions, a second horizontal scanning frame is carried out. It is centred close to this tracing A'7-A'1, and has a tighter vertical pitch and lower vertical amplitude in such a manner as to determine the points A1 and A7.

The measurement is similar to the measurement of the simplified process. It is shown in FIG. 13. The particularities of this measurement are the following. The tracing of each radial line begins at I, by a dark video. The tracing of each radial line is only interrupted when a lit/dark transition follows a dark/lit transition. The contour of the exterior quadrilateral bounding the lit surface area is finally obtained. The orientation of the sides of its contour gives the orientation of the reflector CC from which the position of the apex O of the cube corner is deduced. The grouping of the intermediate points of dark/lit video transition on the radial lines into groups of at least three aligned points allows the polygonal contour of the central shadow to be reconstructed. Otherwise, complementary radial lines, limited in length to this contour, are added. The contour of the interior polygon that bounds the dark surface is finally obtained. The position of at least two of its apices gives the position of the reflector CC. The position J of the "centre" of the reconstructed dark polygon is calculated. The point J of the preceding measurement is a point internal to the calculated dark quadrilateral. This point also remains a point internal to the dark quadrilateral of the following measurement, as long as the offset between these two quadrilaterals is sufficiently small. If such is the case, the following orientation measurement uses this point as centre I for its radial line tracing; it then ends up, as indicated previously, with the determination of the next dark quadrilateral and of its centre. If such is not the case, the search phase is re-initialized.

Going into or maintaining the closed-loop control mode therefore consists of verifying, prior to beginning each new complete tracing for the next measurement, that this new centre I is included within the central shadow, in other words, that this new centre I of the radial lines actually still has a dark video and that, on the horizontal radial line containing it, it is preceded by a lit/dark transition and that it is followed by the inverse transition.

The image memory used allows the video to be continuously recorded as a function of the two coordinates x and y representing the position on the projection plane P1. A two-dimensional analysis of the traces can thus be carried out in order to determine the best position of the video transition points, taking into account the spatial and temporal samplings and the diameter of the projected pencil beam. If, for simplification, only a one-dimensional analysis, along each tracing, is carried out, or else if no analysis is carried out, the organisation and the capacity of the memory containing the tracing can be considerably lightened. For example, for the real process in closed-loop control mode, for each measurement cycle, only the following parameters need to be recorded:

the coordinates of the centre of the radial lines;
the coordinates of the two video transitions on each radial line;
the measured coordinates of the centre of the quadrilateral.

Figure 14:
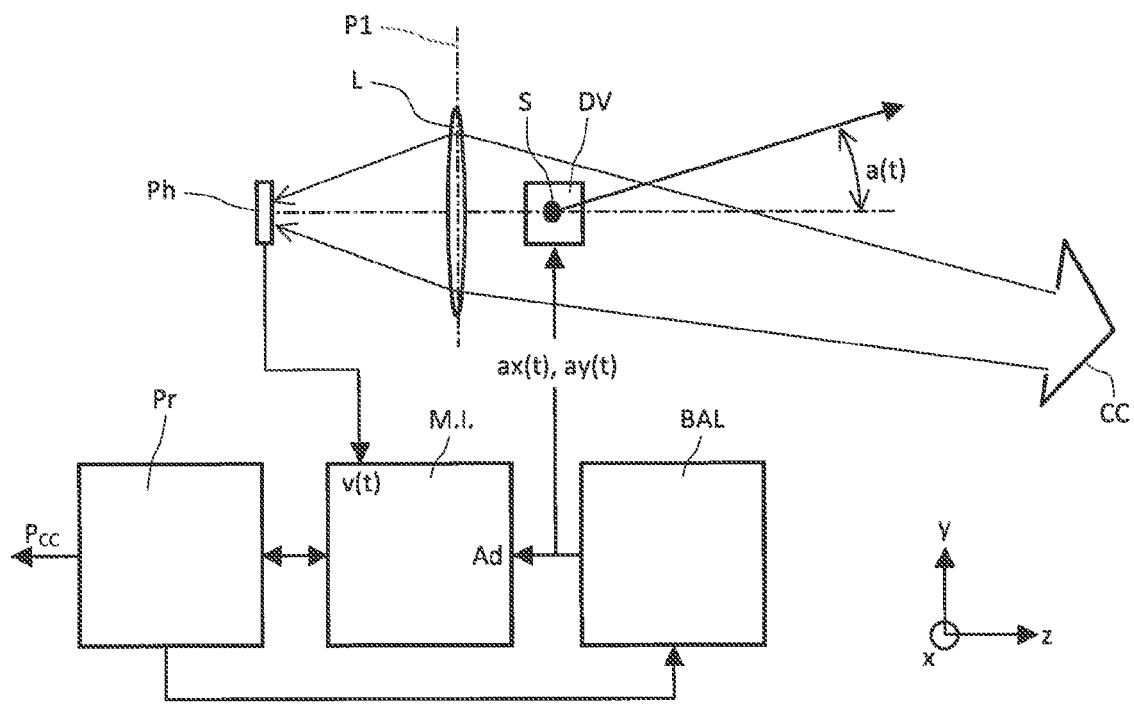
FIG. 14 shows a general schematic diagram of a posture detection system according to the invention.

FIG. 14 shows the general schematic diagram of a posture detection system according to the invention. The source of illumination S consists of a pencil laser beam deflected by a two-axis deviator DV. By way of example, the deviator may be of the acousto-optical type or may use galvanometric mirrors. The plane P1 is the common plane with respect to which the instantaneous orientation a(t) of the illuminating pencil beam and the presence of a reflected pencil beam are identified.

The deviator DV receives the two beam orientation parameters ax(t) and ay(t) coming from a scanning generator BAL. These two parameters also determine the address Ad for writing into the image memory M.I. The data D written into the memory is the video v(t) supplied by the photodetector Ph. The processor Pr controls the scanning generator BAL, analyzes the data stored in the memory M.I. and performs the calculations which supply the orientation and the position, in other words the posture $P_{CC}$, of the reflector CC.

The photodetector detects the limit of the peripheral orientations of the illuminating pencil beam starting from which the reflected pencil beam is extinguished. The shape of this limit allows the orientation, then the position of the cube corner and of its mask to be calculated.

The body of the deviator DV of known shape only masks the reflected pencil beams corresponding to illuminating pencil beams with a small deviation with respect to the direction S-S0. The latter do not participate in the determination of the preceding limit.

On the other hand, these pencil beams with a small deviation participate in the determination of the limit of the central orientations below which the reflected pencil beam is extinguished. The shape of this limit allows the precision of the position of the cube corner CC to be increased.

In order to use a detector Ph with reduced dimensions, for example a photodiode, the latter is placed close to the focal point of a focussing converging lens L, itself placed in the plane P1 of detection. The quality of this lens and the positioning of the photodetector with respect to the latter are not critical given that the detector is, above all, a light intensity collector.

Figure 15:
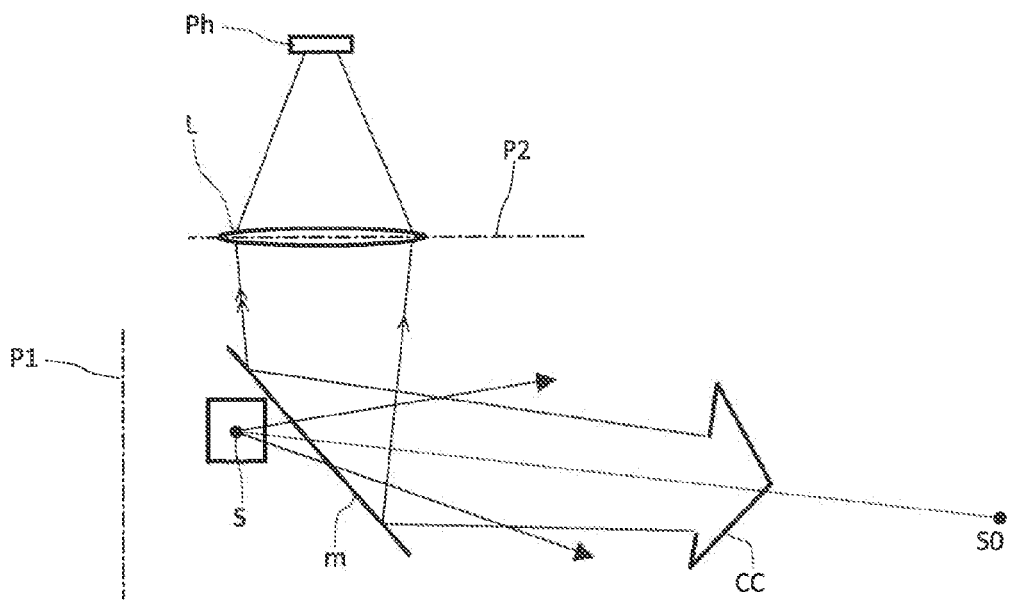
FIG. 15 shows one variant to the preceding setup comprising a semi-reflecting plate.

In one variant embodiment illustrated in FIG. 15, the emission and reception channels are separated by means of a mirror m. The orientation of the plane P1 on which the orientation of the illuminating pencil beam is observed is different from that of the plane P2 on which the presence of a reflected pencil beam is measured. A specific reflecting mirror m combines these two orientations. The reflecting layer of the mirror m is removed in the centre over a surface area with a known contour and position in such a manner as to allow the emission beam from the source of illumination S through. The deviation centre of the deviator DV is close to the centre of this surface, at the back of the mirror m.

As previously, the reflection removal only eliminates the reflected pencil beams corresponding to illuminating pencil beams with a small deviation. The latter do not participate in the measurement of the orientation of the cube corner, but allow the measurement of its position to be improved.

In any case, the known shape of the reflection removal allows the position of the cube corner to be measured.

Figure 16:
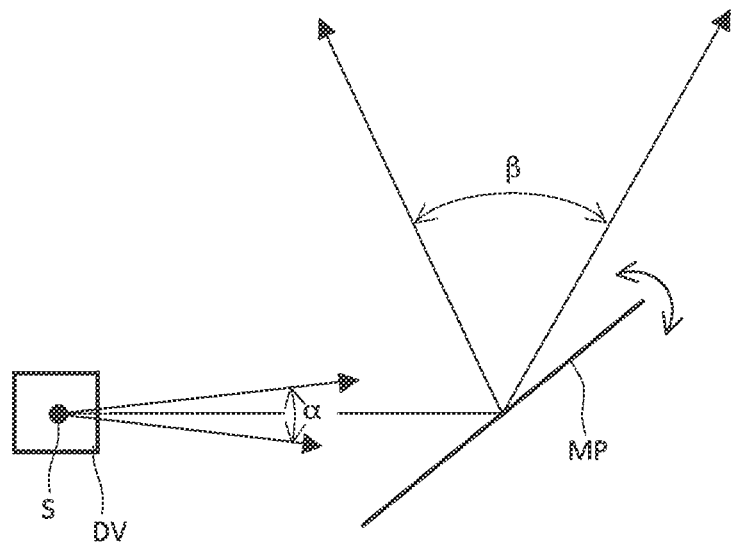
FIG. 16 shows a posture detection system with a very wide field according to the invention.

The range of possible positions of the reflector CC is necessarily limited by the angular field α of the deviator DV centred on S. In order to increase this range of positions, in one variant embodiment illustrated in FIG. 16, a pivoting mirror MP is interposed on two axes between the centre S of the deviator DV and the cube corner. Its role is to follow the variations in position of the reflector, in such a manner that the precise orientation measurement carried out by the deviator DV is always made in the neighbourhood of the centre of its angular field. The final field β is larger than the initial field of the deviator.

The search phase carried out by the deviator DV is then no longer necessary; it is replaced by a search phase with a wider angular field performed by the pivoting mirror MP. In the search phase, the deviator DV fixes the illuminating pencil beam at that centre of its angular field, the deviation of the pencil light beam in TV mode being achieved by the rotation of the mirror MP alone. Once the photodetector Ph has detected a lit horizontal segment of maximum size, such as the segment A7-A1 previously described, the orientation of the mirror MP is fixed at the centre of this segment.

In the measurement phase, the deviation of the pencil light beam in radial line tracing mode is carried out by the deviator DV alone. The known position and orientations of the MP are used in the calculation of the orientation and position of the cube corner.

Figure 17:
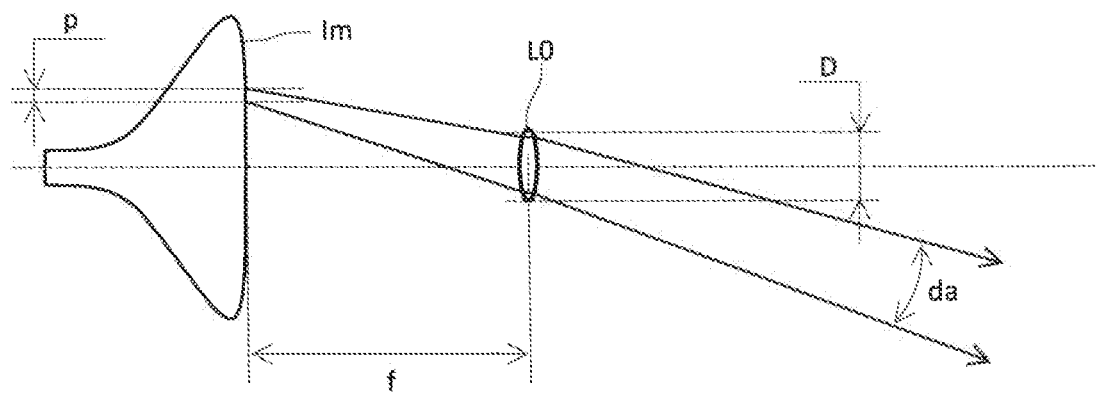
FIG. 17 shows one particular embodiment of the point source and of its scanning system.

In one variant embodiment, the laser source and its scanning system are replaced by an imager. The source and the deviation means are formed by an imager composed of pixels and disposed at the focal point of a lens with a small diameter, at a given moment in time, a pixel or a small set of pixels with known positions being addressed on the said imager. This disposition is illustrated in FIG. 17. The device for generating the pencil light beam in rotation then comprises:

an imager Im with a non-multiplexed addressing. This imager may be a cathode-ray tube addressed in "cavalier" mode on the screen from which the figuration is traced which generates the light scannings described previously;

a converging lens L0 of focal length f.

The centre of rotation of the emitted pencil beam is the centre of L0. The illuminated pixel of the imager at time t gives the instantaneous orientation of the emitted pencil light beam. Each pixel with dimensions p produces a pencil light beam of diameter D and of divergence da=p/f.

The part of the emitted light intensity Fe transferred to the light intensity F produced by a pixel of the screen, assumed to be Lambertian, is a function of the solid angle Ω of emission through the lens L0. In the following relationship:

$Fe/F = \Omega/\pi = (\pi D^2/4\pi f^2) = D^2/4f^2 = [D^2 \cdot (da)^2]/4p^2$, this ratio decreasing as the diameter D and the divergence da of the pencil beam decrease.

The size of this device renders it more adapted to the configuration using a reflecting mirror previously described. In this variant embodiment, the limited value of the total deviation range can be compensated by using a complementary pivoting mirror as previously described.

What is claimed:

1. System for detecting the posture of a mobile object in space, the said system comprising:
an electro-optical device of known orientation comprising a light source, a photoreceptor and a means of analysis of the signal coming from the said photoreceptor;

an optical assembly comprising at least one cube corner disposed on the mobile object, the said cube corner comprising a mask of known geometrical shape disposed on its entry face;

in which:

the source emits a parallel or almost-parallel pencil beam;

the electro-optical device comprises means for generating a pencil light beam angularly controlled and rotating about a fixed point;

the photoreceptor being configured for receiving the pencil beam of light retro-reflected by the cube corner when it is illuminated by the deviated pencil beam of light coming from the light source, the means of analysis being configured in such a manner as to determine, based on the signal coming from the photoreceptor, the position of a number of points being representative of the borders of the mask of the cube corner and, using this positional information, the posture of the cube corner in space.

2. System for detecting the posture of a mobile object according to claim 1, in which the photoreceptor is disposed at the focal point of a focussing lens disposed in the neighbourhood of the light source.

3. System for detecting the posture of a mobile object according to claim 1, in which the electro-optical device comprises a semi-reflecting plate allowing the emitted pencil beam of light to be separated from the pencil beam of light retro-reflected by the cube corner.

4. System for detecting the posture of a mobile object according to claim 1, in which the electro-optical device comprises an opaque screen of known geometrical shape disposed in the neighbourhood of the emission source.

5. System for detecting the posture of a mobile object according to claim 1, in which the emission source is a laser source.

6. System for detecting the posture of a mobile object according to claim 1, in which the means for generating an angularly-controlled pencil light beam comprises a two-axis laser beam deviator.

7. System for detecting the posture of a mobile object according to claim 1, in which the source and the generation means are composed of an imager composed of pixels and disposed at the focal point of a lens with a small diameter, at a given moment in time, one pixel or a small set of pixels with known positions being addressed on the said imager.

8. System for detecting the posture of a mobile object according to claim 1, the said detection system comprising two modes of operation, the first mode being a search mode in which the generation means deviates the pencil beam of light into a wide angular space in such a manner as to scan the maximum displacement volume of the cube corner;

the second mode being a measurement mode in which the generation means deviates the pencil beam of light into a restricted angular space, sufficient to cover the entry surface area of the cube.

9. System for detecting the posture of a mobile object according to claim 8, in which, in the second mode, the generation means deviates the pencil beam of light in such a manner as to obtain, by projection onto a reference plane, a certain number of radiating lines centred on a central point, this point being the fixed projection of a pencil beam of light directed onto the entry face of the cube corner, the points being representative of the borders of the mask of the cube corner being obtained by the determination of the angular position of the end of each radial line.

* * * * *